United States Patent
Taylor et al.

(10) Patent No.: US 10,486,301 B2
(45) Date of Patent: Nov. 26, 2019

(54) MECHANICAL OVERSTOCK AUDIT TOOL AND ASSOCIATED METHODS

(71) Applicant: Walmart Apollo, LLC, Bentonville, AR (US)

(72) Inventors: Robert James Taylor, Rogers, AR (US); Jason Bellar, Bentonville, AR (US); Kenneth Jeffrey Dobbs, Rogers, AR (US); Matthew David Alexander, Rogers, AR (US); Leigh Ann Marie Scobey, Bentonville, AR (US); Jamison Lonnie Kyle Sibley, Rogers, AR (US); William C. Maestas, Deland, FL (US)

(73) Assignee: Walmart Apollo, LLC, Bentonville, AR (US)

( * ) Notice: Subject to any disclaimer, the term of this patent is extended or adjusted under 35 U.S.C. 154(b) by 7 days.

(21) Appl. No.: 15/484,651

(22) Filed: Apr. 11, 2017

(65) Prior Publication Data

US 2017/0291294 A1  Oct. 12, 2017

Related U.S. Application Data

(60) Provisional application No. 62/321,347, filed on Apr. 12, 2016.

(51) Int. Cl.
*B25J 1/04* (2006.01)
(52) U.S. Cl.
CPC ....................... *B25J 1/04* (2013.01)
(58) Field of Classification Search
CPC .......................................................... B25J 1/04

USPC .............................. 294/24, 26, 209, 210, 175
See application file for complete search history.

(56) References Cited

U.S. PATENT DOCUMENTS

| | | | | |
|---|---|---|---|---|
| 676,097 | A | * | 6/1901 | McClelland |
| 1,339,444 | A | * | 5/1920 | Ferguson ............. A47G 1/1686 |
| | | | | 294/24 |
| D261,595 | S | * | 11/1981 | Yellin ................ 294/2 |
| 4,758,035 | A | * | 7/1988 | Shimasaki ................ B25J 1/04 |
| | | | | 294/111 |
| 4,899,050 | A | * | 2/1990 | Cianflone .............. H01H 17/08 |
| | | | | 200/331 |
| 5,228,226 | A | * | 7/1993 | Porosky ................ A01K 97/14 |
| | | | | 294/26 |
| D345,680 | S | * | 4/1994 | Reynolds ....................... 294/24 |

(Continued)

FOREIGN PATENT DOCUMENTS

| | | |
|---|---|---|
| CN | 202915850 | 5/2013 |
| CN | 202915850 U | 5/2013 |

(Continued)

*Primary Examiner* — Paul T Chin
(74) *Attorney, Agent, or Firm* — McCarter & English, LLP; David R. Burns

(57) ABSTRACT

Example overstock audit tools and associated methods are described. The example overstock audit tool includes a body defining a distal end and a proximal end, and a cutout formed in the body and extending from the proximal end. The cutout can be configured and dimensioned to be placed against a shelf edge to align the handle portion with the shelf edge. The overstock audit tool includes an elongated portion attached to and extending from the handle portion. An example overstock audit tool can include a roller mechanism configured to slidably secure the handle portion to the shelf edge.

15 Claims, 16 Drawing Sheets

(56) References Cited

U.S. PATENT DOCUMENTS

| | | | | |
|---|---|---|---|---|
| 5,347,439 | A | * | 9/1994 | Warren ................ F21L 15/08 200/331 |
| 5,590,923 | A | * | 1/1997 | Berger .................. B25J 1/04 294/116 |
| 6,003,235 | A | | 12/1999 | Chen |
| 7,987,611 | B2 | | 8/2011 | Taylor |
| D701,098 | S | * | 3/2014 | Braver ........................ D8/14 |
| 9,120,623 | B2 | | 9/2015 | Hanel |
| 9,993,708 | B2 | * | 6/2018 | Fox .................... A63B 67/06 |
| 2003/0122390 | A1 | * | 7/2003 | Slauf .................. B25G 1/04 294/210 |
| 2009/0261607 | A1 | * | 10/2009 | Braver ................ A47F 13/06 294/26 |
| 2012/0237330 | A1 | | 9/2012 | Wensman |

FOREIGN PATENT DOCUMENTS

| | | |
|---|---|---|
| CN | 104764380 | 7/2015 |
| CN | 104764380 A | 7/2015 |
| EP | 0722894 | 7/1996 |
| EP | 0722894 A1 | 7/1996 |
| FI | 953671 | 2/1997 |
| FI | 953671 A | 2/1997 |

* cited by examiner

MECHANICAL OVERSTOCK AUDIT TOOL AND ASSOCIATED METHODS

CROSS-REFERENCE TO RELATED APPLICATIONS

This application claims the benefit of, commonly assigned U.S. Provisional Patent Application No. 62/321,347, which was filed on Apr. 12, 2016. The entire content of the foregoing provisional patent application is incorporated herein by reference.

BACKGROUND

Retail environments generally include a variety of storage locations for overstock, such as non-customer areas at the back of the retail environment and storage areas at the top of shelves or risers. For safety and other reasons, retail environments may establish standards for the depth, height and weight of overstock stored on top of the risers. For example, a riser can have a height of approximately seven feet and the retail environment standards can limit the height of overstock on top of the riser to approximately twenty inches. Measuring compliance of such standards can be a difficult task, involving the use of a ladder and tape measure, resulting in a time consuming and inaccurate process.

SUMMARY

Exemplary embodiments of the present disclosure provide a mechanical overstock audit tool that allows for efficient and accurate measurement of retail environment standards for overstock storage on top of risers. In particular, the exemplary overstock audit tool includes a handle portion that allows the overstock audit tool to be repeatedly and consistently aligned with the same position along a top shelf, and further includes an elongated portion extending from the handle portion for measuring compliance with the height standard of overstock storage. Automatic alignment of the handle portion with the top shelf of the riser ensures repeated accurate measurement of the height of overstock storage.

In accordance with embodiments of the present disclosure, an exemplary overstock audit tool is provided that includes a handle portion and an elongated portion. The handle portion can include a body defining a distal end and a proximal end. The handle portion can include a cutout formed in the body that extends from and/or is formed in the proximal end. The cutout can be configured and dimensioned to be placed against a shelf edge to align the handle portion with the shelf edge. The elongated portion can be attached to and extend from the handle portion, e.g., the proximal end of the handle portion.

The cutout portion can define a triangular configuration. The cutout includes a first angled section extending inwardly from the proximal end towards the distal end and a second angled section extending inwardly from a front edge, the front edge extending between the proximal and distal ends of the body. The handle portion can include a grip section formed in the body and disposed between the distal end and the proximal end. The grip section can define an undulating or ergonomic configuration on the front edge for grasping the handle portion with the hand of a user. The grip section can be formed in the body immediately adjacent to the cutout.

The handle portion can include a rounded distal end. The rounded distal end can include a magnet for attachment of the overstock audit tool to, e.g., a shelf or other metal structure. In some embodiments, the overstock audit tool can include a roller mechanism configured to slidably secure the handle portion to the shelf edge. In some embodiments, the roller mechanism can include a spring-loaded bearing imparting a force against the shelf edge to maintain the handle portion slidably secured to the shelf edge.

The elongated portion can include an elongated first section and a second section extending at an angle from a distal end of the elongated first section. The elongated first section can be dimensioned to define a height measurement standard for overstock standards. The second section can extend substantially perpendicularly relative to the elongated first section. The second section can include a crook or hook formed at a distal end of the second section.

In accordance with embodiments of the present disclosure, an exemplary method of measuring overstock standard compliance is provided that includes positioning an overstock audit tool against a shelf edge (and/or a horizontal shelf surface). The overstock audit tool can include a handle portion including a body defining a distal end and a proximal end. The handle portion can include a cutout formed in the body and extending from the proximal end. The cutout can be configured and dimensioned to receive and engage the shelf edge. The overstock audit tool can include an elongated portion attached to and extending from the handle portion. The method includes aligning the handle portion with the shelf edge by aligning the cutout with the shelf edge. The method includes measuring a height of overstock relative to the shelf edge with the elongated portion.

Aligning the cutout with the shelf edge can level the overstock audit tool relative to the shelf edge. The cutout can maintain alignment between the handle portion and the shelf edge while sliding the handle portion along the shelf edge. The overstock audit tool can include a roller mechanism configured to slidably secure the handle portion against the shelf edge. The roller mechanism can maintain alignment between the handle portion and the shelf edge while sliding the handle portion along the shelf edge.

Any combination and/or permutation of embodiments is envisioned. Other objects and features will become apparent from the following detailed description considered in conjunction with the accompanying drawings. It is to be understood, however, that the drawings are designed as an illustration only and not as a definition of the limits of the present disclosure.

BRIEF DESCRIPTION OF THE DRAWINGS

To assist those of skill in the art in making and using the disclosed overstock audit tool and associated methods, reference is made to the accompanying figures, wherein.

DETAILED DESCRIPTION

Exemplary embodiments of the present disclosure provide an overstock audit tool that allows for efficient and accurate measurement of retail environment standards for overstock storage on top of risers. In particular, the exemplary overstock audit tool includes a handle portion that allows the overstock audit tool to be repeatedly aligned with the same position along a top shelf, and further includes an elongated portion extending from the handle portion for measuring compliance with the height standard of overstock storage. Automatic alignment of the handle portion with the top shelf of the riser ensures repeated accurate measurement of the height of overstock storage.

Figure 1:
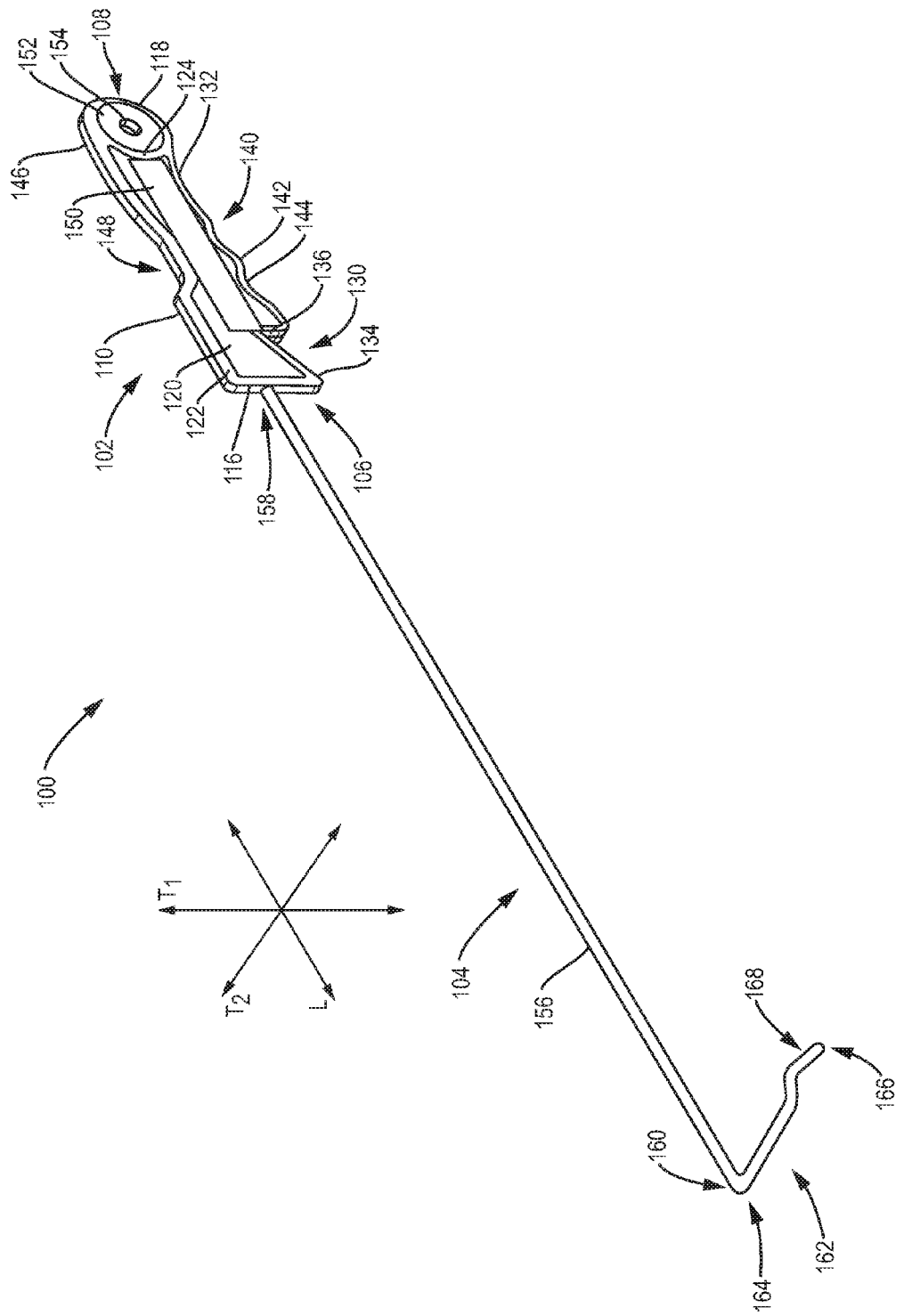
FIG. 1 is a perspective view of an exemplary overstock audit tool of the present disclosure.
Figure 2:
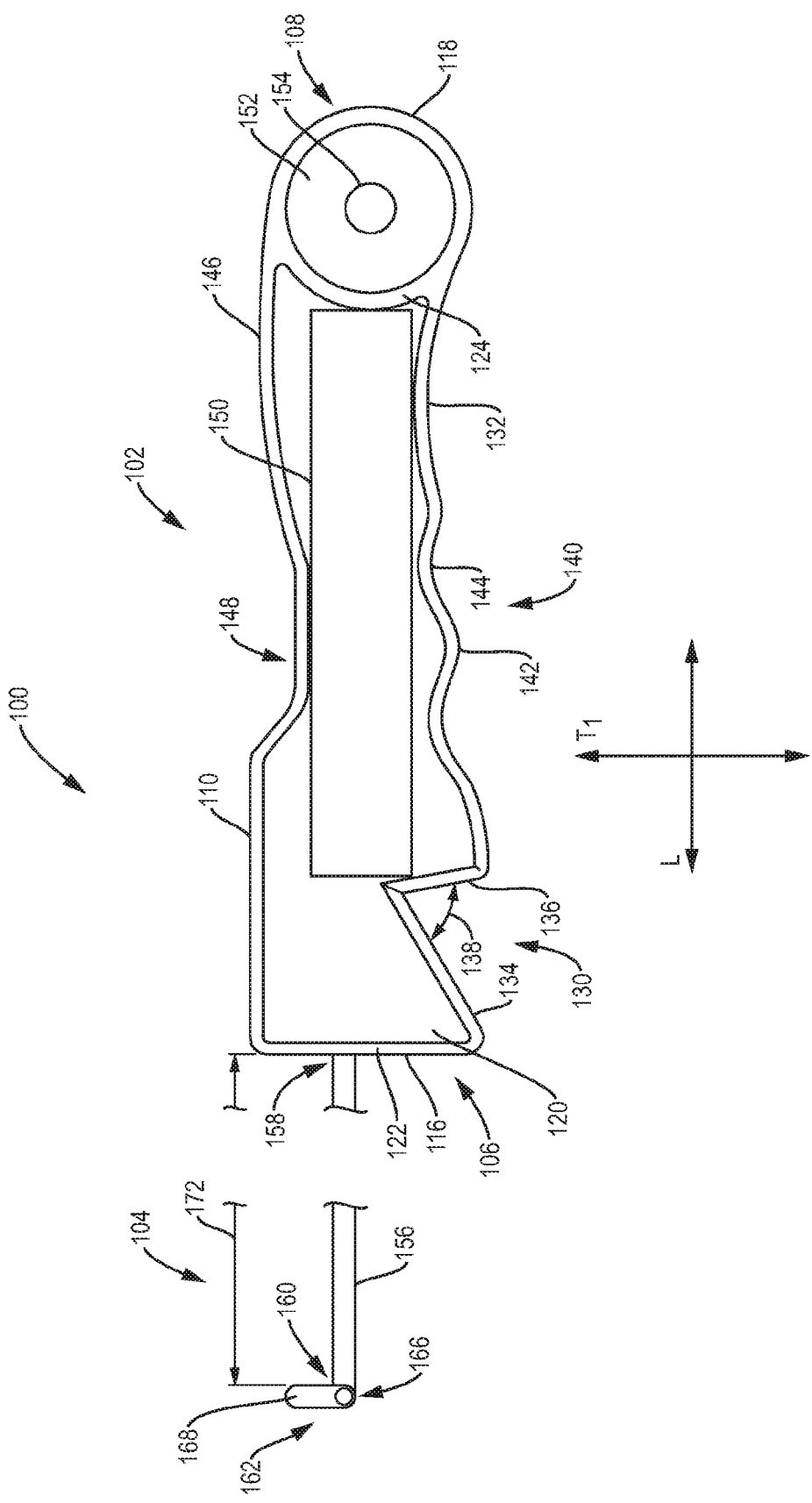
FIG. 2 is a side view of an exemplary overstock audit tool of FIG. 1.
Figure 3:
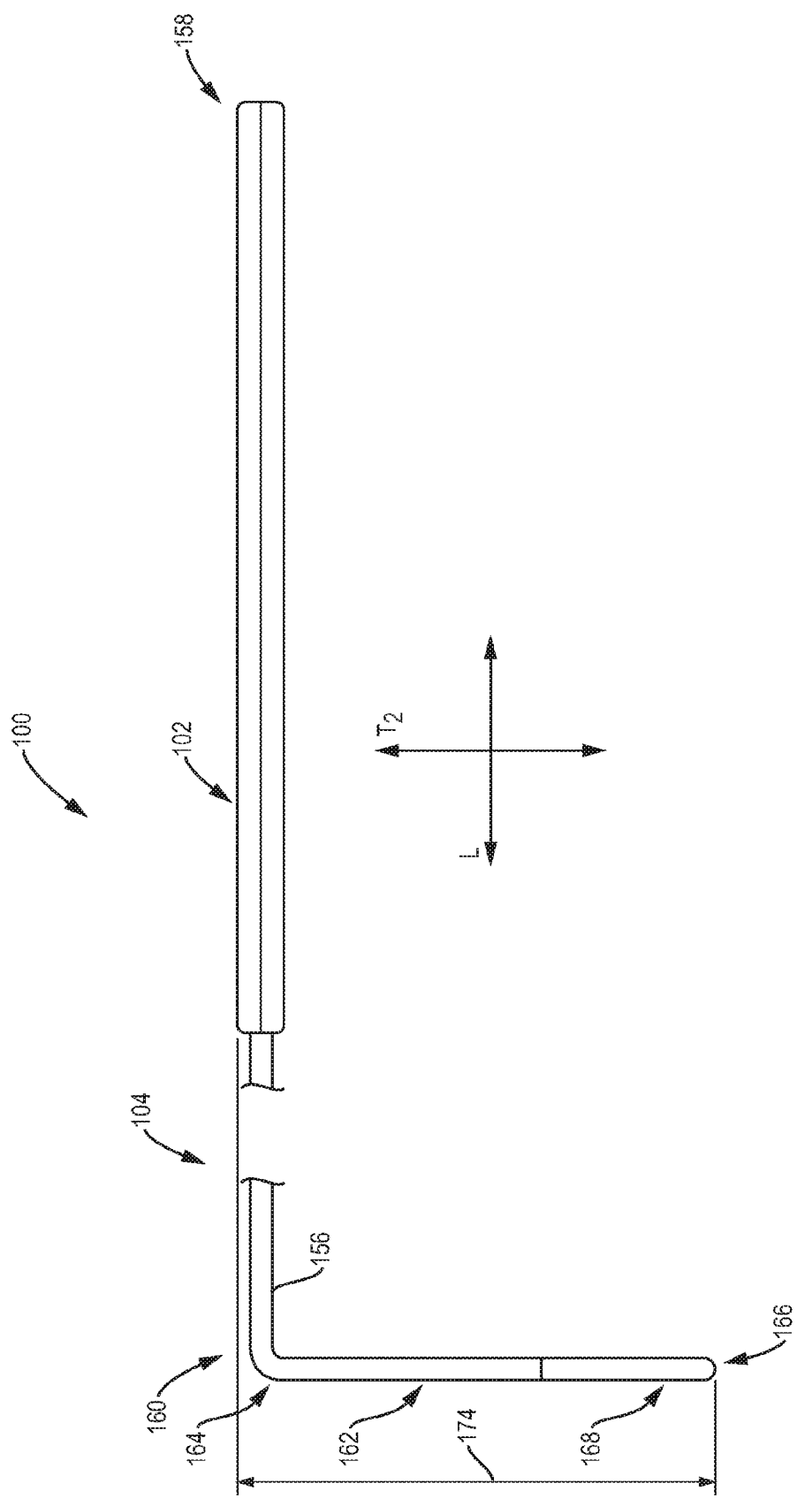
FIG. 3 is a top view of an exemplary overstock audit tool of FIG. 1.
Figure 4:
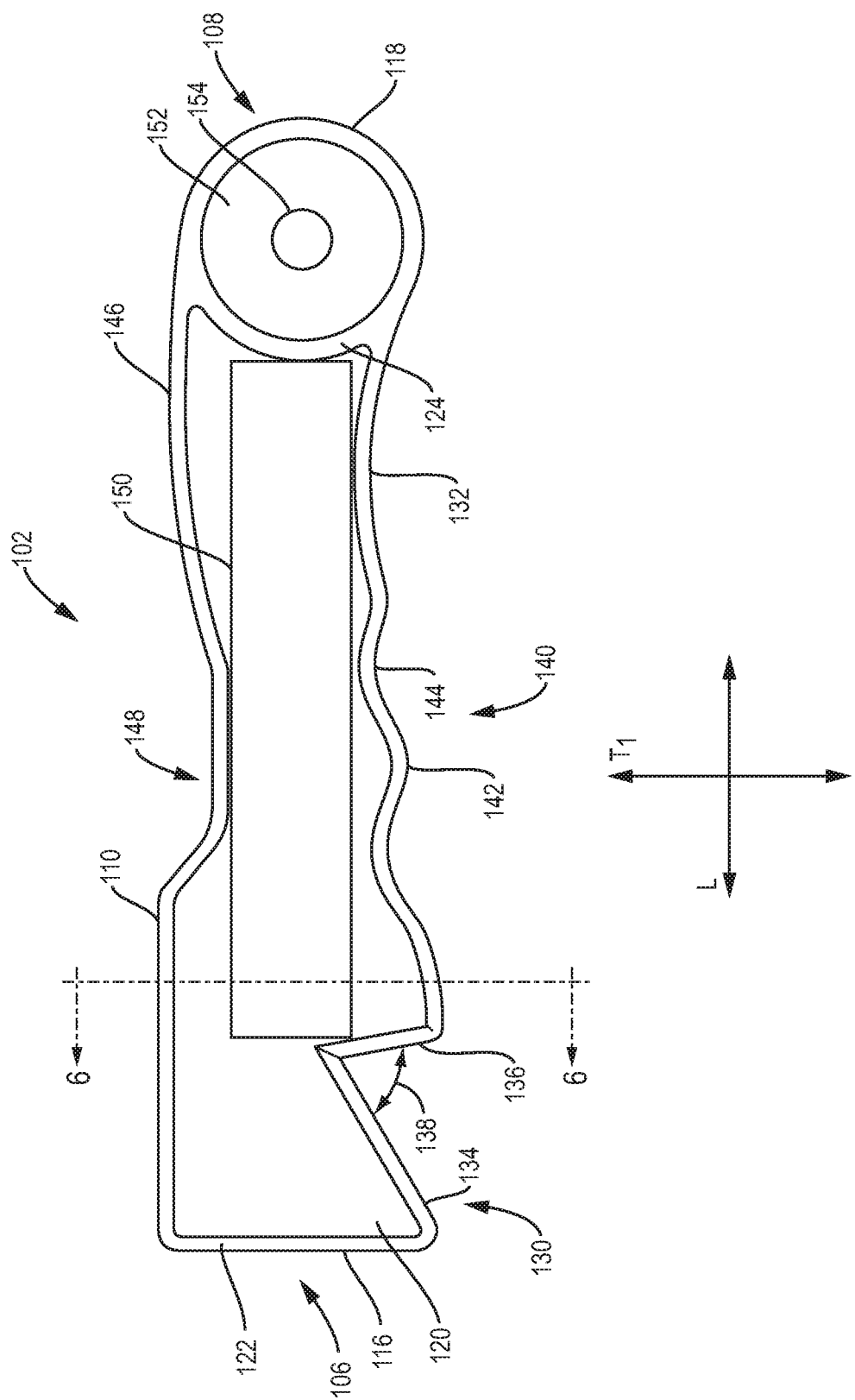
FIG. 4 is a side view of a handle portion of an exemplary overstock audit tool of FIG. 1.
Figure 5:
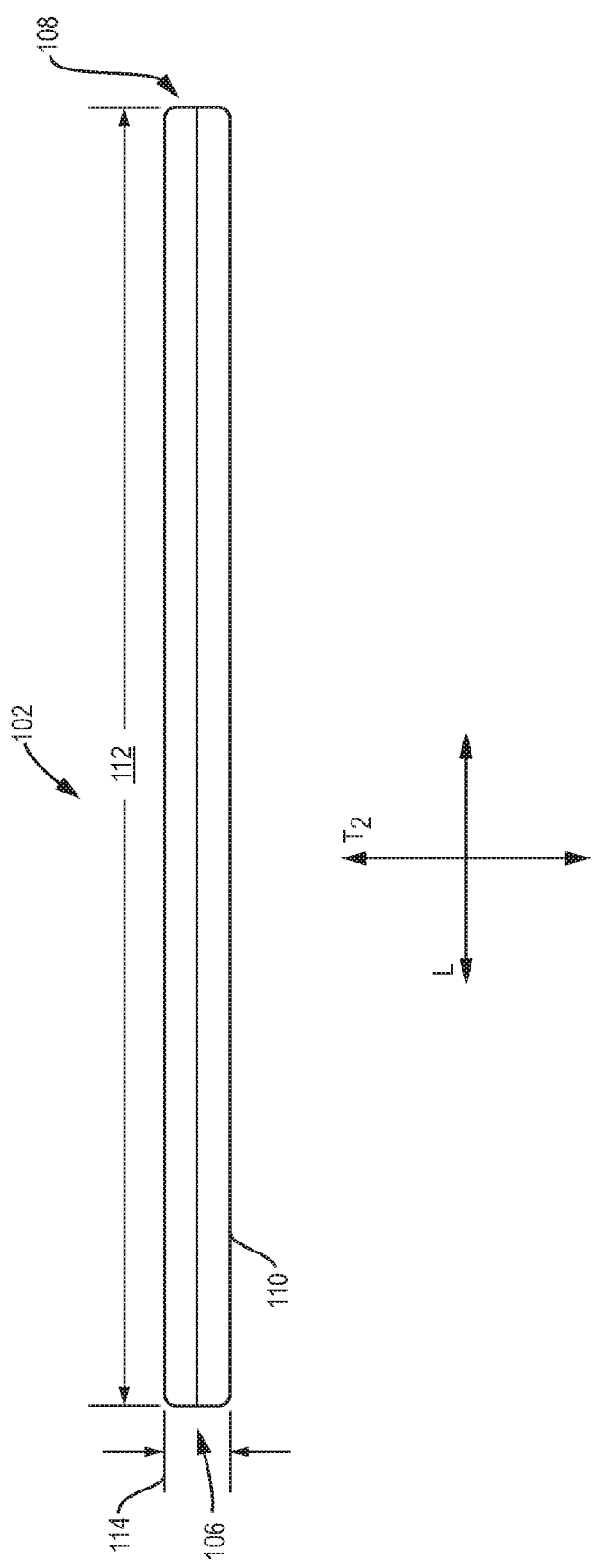
FIG. 5 is a top view of a handle portion of an exemplary overstock audit tool of FIG. 1.
Figure 6:
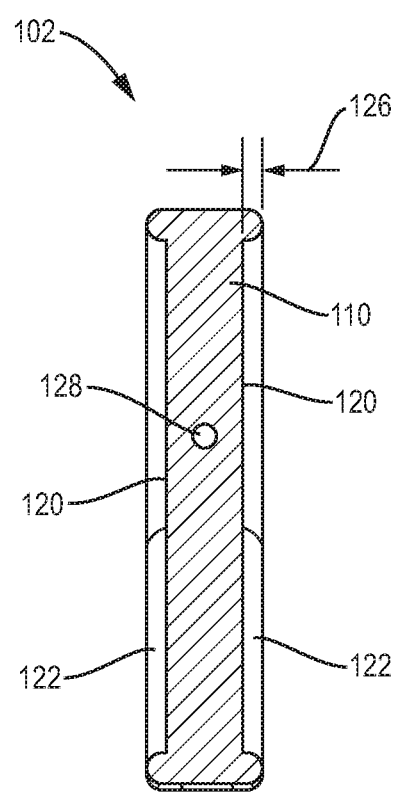
FIG. 6 is a cross-sectional view of a handle portion of an exemplary overstock audit tool of FIG. 1.

FIGS. 1-6 are perspective, side, top and cross-sectional views of an exemplary overstock audit tool 100 (hereinafter "tool 100"). The tool 100 generally includes a handle portion 102 and an elongated portion 104. FIGS. 4-6 are detailed and cross-sectional views of the handle portion 102 and FIGS. 1-3 show perspective, side and top views of the elongated portion 104. With respect to FIGS. 1, 2 and 4-6, the handle portion 102 is formed by a body 110 extending along a longitudinal axis L between a proximal end 106 and a distal end 108. In some embodiments, the handle portion 102 can be formed from a lightweight, plastic material. In some embodiments, the handle portion 102 can be formed from a metal. The body 110 defines a length 112 measured along the longitudinal axis L between the proximal end 106 and the distal end 108 and a width 114 measured along a first transverse axis $T_1$ that extends perpendicularly with respect to the longitudinal axis L. The length 112 is dimensioned greater than the width 114, e.g., twenty-two times greater, twenty times greater, eighteen times greater, sixteen times greater, or the like.

The proximal end 106 defines a substantially planar proximal edge 116 that extends along a second transverse axis $T_2$, which extends perpendicularly with respect to the longitudinal axis L and the first transverse axis $T_1$. The distal end 108 includes a rounded section 118 defining a rounded edge. In some embodiments, the body 110 can include a receded planar surface 120 on opposing sides of the body 110 and a raised perimeter edge 122 extending along the entire perimeter of each of the opposing sides of the body 110. In some embodiments, the raised perimeter edge 122 can also extend around the perimeter of the rounded section 118, resulting in a raised, round edge 124 at the distal end 108. In some embodiments, the height 126 of the perimeter edge 122 as measured from the receded planar surface 120 (e.g., a distance of the perimeter edge 122 from the receded planar surface 120) can be approximately, e.g., ⅕, ⅙, ⅐, or the like, of the overall width 114 of the body 110. The body 110 can include an aperture 128 passing partially therethrough from the proximal end 106 in the direction of the distal end 108 along the longitudinal axis L. The aperture 128 can be configured to receive a proximal end of the elongated portion 104 to secure the elongated portion 104 to the handle portion 102. In some embodiments, the elongated portion 104 can be hot pressed to a depth of, e.g., approximately two inches, into the aperture 128 and in line with the handle portion 102. In some embodiments, the elongated portion 104 can pass into the body 110 up to a central aperture 154 formed in the rounded portion 118, and curves around the perimeter of the central aperture 154 within the body 110 to secure the elongated portion 104 within the body 110. In particular, the perimeter of the central aperture 154 assists in securing the end of the elongated portion 104 within the body 110.

The handle portion 102 includes a cutout 130 formed in the body 110. The cutout 130 extends inwardly from the proximal edge 116 at an angle relative to a front edge 132 of the body 110. In particular, the cutout 130 includes a first angled section 134 extending inwardly from the proximal edge 116 and a second angled section 136 extending inwardly from the front edge 132. That is, a length of the first angled section 134 extends from a terminus of the proximal edge 116 towards the distal end 108 at an angle, other than ninety degrees, relative to the longitudinal axis L, extends at an angle, other than ninety degrees, relative to the first transverse axis $T_1$, and extends perpendicularly with respect to the second transverse axis $T_2$. The second angled section 136 extends from the front edge 132 in a non-parallel manner relative to the proximal edge 116. That is, a length of the second angled section 136 extends inwardly from the front edge 132 at an angle, other than ninety degrees, with respect to the longitudinal axis L, extends at an angle, other than ninety degrees, with respect to the first transverse axis $T_1$, and extends perpendicularly with respect to the second transverse axis $T_2$. The intersection between the first and second angled sections 134, 136 forms an acute angle 138, e.g., approximately 60°, 65°, 70°, 75°, 80° or the like.

The cutout 130 can be configured and dimensioned to be placed against a shelf edge (e.g., a front surface of the shelf edge) to align the handle portion 102 with the shelf edge. In particular, the planar surfaces of the first and second angled sections 134, 136 can ensure that the handle portion 102 is level relative to the surfaces of the shelf edge. Automatic alignment of the handle portion 102 relative to the shelf edge due to the configuration of the cutout 130 ensures reliable, consistent, and repeated placement of the handle portion 102 against the shelf edge.

The front edge 132 of the body 110 can include a grip section 140 formed therein. The grip section 140 can be disposed between the cutout 130 near the proximal end 106 and the rounded section 118 at the distal end 108. The grip section 140 can define a curved, undulating or scalloped surface including two or more peaks 142 and valleys 144 ergonomically formed to provide a grasping surface for the hand of a user. The rear edge 146 of the body 110 can include an inwardly directed concave portion 148 formed therein. The concave portion 148 can be disposed on an opposing side of the body 110 with respect to the grip section 148 and can be aligned with the grip section 140 of the front edge 132 such that the concave portion 148 can receive a portion of the hand of the user and provides a gripping surface when using the tool 100.

In some embodiments, the body 110 can include a label section 150 disposed between the rounded section 118 and the cutout 130 on the receded planar surface 120. The label section 150 can be configured and dimensioned to receive a label (e.g., a label secured to the label section 150 with adhesive). In some embodiments, the rounded section 118 can include a magnet 152 attached to opposing sides of the body 110 in a non-opposing manner. The magnets 152 can be used to secure the tool 100 to surrounding metal fixtures, such as underneath a shelf or on the side of a shelf for storage. In some embodiments, the rounded section 118 can include a central aperture 154 passing therethrough. The central aperture 154 can pass through the magnets 152 and provides an opening for securing the tool 100 to, e.g., a hook.

In some embodiments, the handle portion 102 can include a level secured thereto and/or integrated therein. The level can be used to ensure that the handle portion 102 is level relative to the shelf edge when the tool 100 engages the shelf edge. In some embodiments, the handle portion 102 can include a light emitting diode (LED) attached thereto or formed into the body 110. In some embodiments, the handle portion 102 can include a clip to hang the tool 100 on a pocket or a belt loop. In some embodiments, the handle portion 102 can include an anti-theft or security feature (e.g., an electronic article surveillance (EAS) security tag) embedded within the body 110. The security feature can trigger door alarms in the retail environment to prevent customers and/or associates from removing the tool 100 from the retail environment. In some embodiments, the handle portion 102 can include a cutting edge or point extending therefrom (or extendable therefrom). The cutting edge or point can be used to open boxes or cut other materials, such as tape.

With reference to FIGS. 1-3, the elongated portion 104 includes an elongated (vertical) section 156 defining a first length extending along the longitudinal axis between a proximal end 158 and a distal end 160. The elongated portion 104 can be in the form of a metal rod defining a substantially cylindrical cross-section. The elongated section 156 can extend between the proximal and distal ends 158, 160 in a straight and curve-free manner, e.g., an entire length of the elongated section can extend parallel to the longitudinal axis L.

The elongated portion 104 includes a (horizontal) section 162 extending from the distal end 160 of the elongated section 156. In some embodiments, the section 162 can extend substantially perpendicularly from the distal end 160 of the elongated section 156, e.g., parallel to the first transverse axis $T_1$ or the second transverse axis $T_2$. In particular, the elongated section 156 and the section 162 can be formed from a single metal rod and the metal rod can be bent substantially perpendicularly to create the section 162 at the distal end 160 of the elongated section 156. The section 162 defines a proximal end 164 and a distal end 166. The portion of the section 162 extending from the proximal end 164 extends in a substantially straight and curve-free manner until a crook or hook 168 formed at the distal end 166 of the section 162 is reached. The hook 168 can define a substantially concave, U-shaped or V-shaped configuration.

Figure 17:
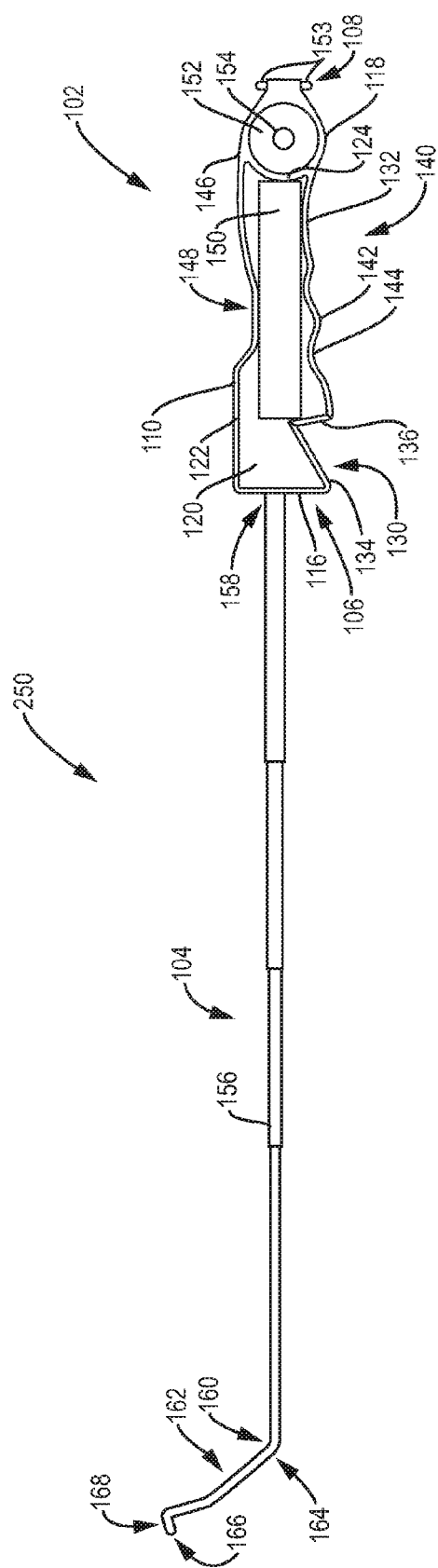
FIG. 17 is a side view of an exemplary overstock audit tool of the present disclosure.

In some embodiments, a length 172 of the elongated section 156 can be dimensioned, e.g., five times, six times, seven times, or the like, greater than a length 174 of the section 162. In some embodiments, the length 172 of the elongated section 156 can be a calibrated, fixed, non-adjustable length dimensioned to check the compliance of overstock with a specific standard. For example, the length 172 can be dimensioned as twenty inches based on an overstock storage standard for a retail environment. In some embodiments, the length 172 can be expandable (e.g., telescoping as shown in FIG. 17), collapsible or foldable for adjustment of the elongated portion 104 to different overstock storage standards. In some embodiments, the elongated section 156 can include graduations formed along the length 172 of the elongated section 156 (e.g., on the spine/body of the elongated section 156) at regular intervals to provide a visual indicator regarding the height of overstock relative to the top surface of the shelf. In some embodiments, the elongated portion 104 can be replaceable to allow for interchanging of the elongated portion 104 while implementing the same handle portion 102 for different overstock storage standards. In some embodiments, a safety mechanism (e.g., a rubber tip, or the like) can be included on the distal end 166 of the section 162 to protect associates, customers and/or products.

During use, the cutout 130 of the handle portion 102 can be positioned against a front surface of a shelf edge such that the elongated portion 104 extends over the top surface of the shelf. The section 162 can provide a visual indicator to the user whether the overstock stored on the shelf meets the overstock storage standard. In particular, the section 162 is located at the uppermost height of allowed storage and, when positioned against the shelf, the section 162 can be used as a gauge to determine whether the stored overstock is above or below the maximum height.

In some embodiments, the elongated portion 104 can include a laser mounted at the distal end 160 (or mounted to the section 162). The laser can be aligned with the maximum height of allowed storage and provides a visual marker on the stored overstock to determine if the overstock storage is in compliance. In some embodiments, the laser can project a dot or line across an entire aisle (or between opposing shelfing/display units in an aisle), thereby providing a visual marker for auditing overstock of the entire shelf and/or opposingly spaced shelfs in an aisle (rather than auditing each individual overstock). In some embodiments, a mirror can be mounted to the section 162, allowing a user to see behind fronted or faced overstock stored on the shelf (e.g., overstock substantially aligned with the front edge of the shelf). In some embodiments, the hook 168 can be used to grab or hook onto overstock stored on the shelf to move or pull the overstock to the front edge of the shelf. In some embodiments, the hook 168 can be used for fronting or zoning products on peg hooks on a display board.

Figure 7:
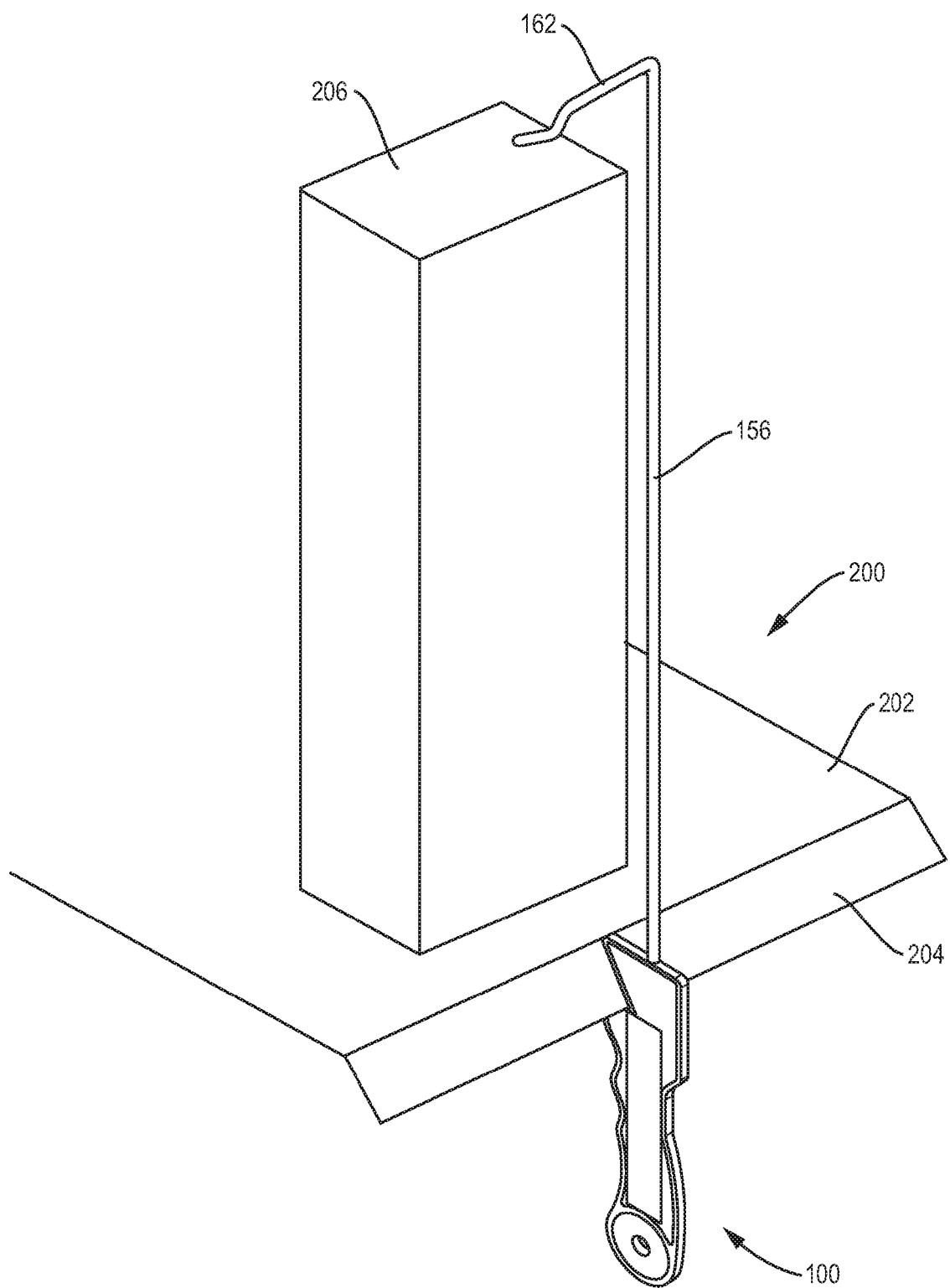
FIG. 7 is a perspective view of an exemplary overstock audit tool of FIG. 1 positioned against a top shelf of a riser.

FIG. 7 shows an implementation of an embodiment of the tool 100 with a riser or shelf 200. The shelf 200 includes a top surface 202 and an angled, front surface 204. The angled, front surface 204 extends from the top surface 202 at an angle complementary to the angle of the first angled section 134 of the handle portion 102. Thus, the cutout 130 of the handle portion 102 can receive at least a portion of the angled surface 204 of the shelf 200 and pressing the first angled section 134 against the front surface 204 aligns the handle portion 102 with the shelf 200. The second angled section 136 of the handle portion 102 can abut the bottom edge (or bottom surface) of the front surface 204 to assist in aligning and attaching the handle portion 102 with the shelf 200.

As shown in FIG. 7, overstock 206 can be stored on the top surface 202 of the shelf 200. When the handle portion 102 is aligned with the shelf 200, the elongated portion 104 extends substantially perpendicularly to the top surface 202 and the section 162 indicates whether the overstock 206 is in compliance with the retail environment standards. For example, the height of the overstock 206 in FIG. 7 is below the section 162, thereby indicating that the overstock 206 is in compliance with the retail environment standards. If additional measurements are to be taken with adjacent overstock, the handle portion 102 can be slid along the front surface 204 of the shelf 200 or can be removed and placed against the appropriate area of the shelf 200. The configuration of the handle portion 102 ensures that the position of the elongated portion 104 is accurately positioned relative to the shelf 200 in a repeated manner.

Figure 8:
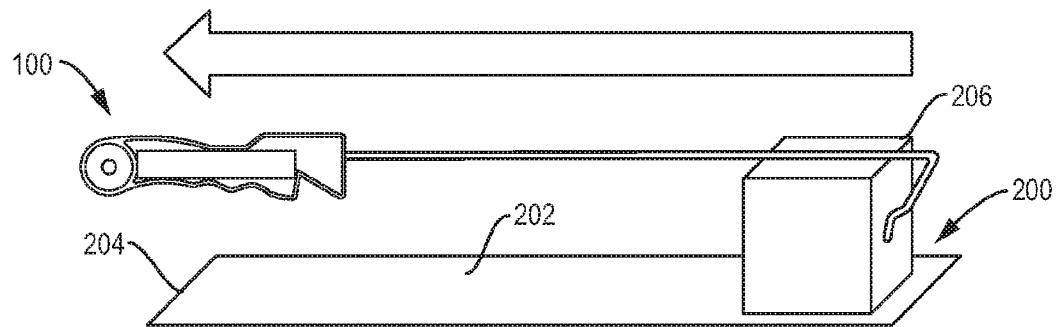
FIG. 8 is a diagrammatic view of an exemplary overstock audit tool of FIG. 1 used for pulling overstock toward a front edge of a shelf.
Figure 9:
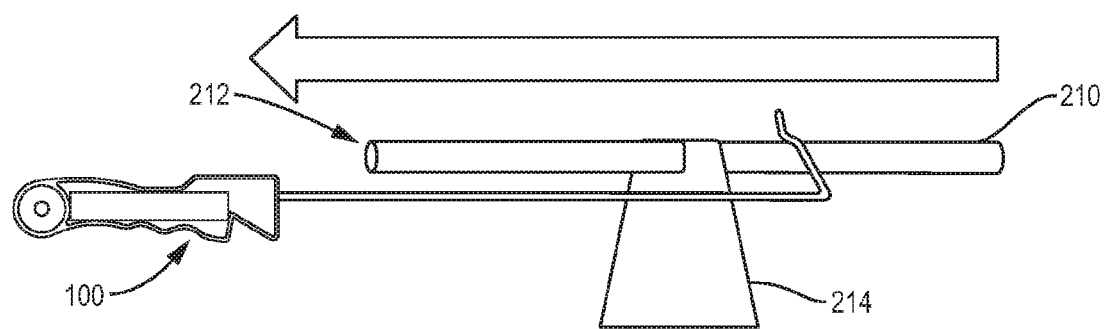
FIG. 9 is a diagrammatic view of an exemplary overstock audit tool of FIG. 1 used for pulling a product hanging on a peg hook toward a front end of the peg hook.

FIGS. 8 and 9 are diagrammatic views of the exemplary tool 100 being used as a fronting or zoning tool. FIG. 8 shows the tool 100 being used to pull overstock 206 toward the front surface 204 of the shelf 200. In particular, the section 162 of the elongated portion 104 of the tool 100 can be used to hook around the overstock 206 and pull the overstock 206 toward the front surface 204 of the shelf 200. Overstock 206 can thereby be aligned with the front surface 204 of the shelf 200 for greater visibility. FIG. 9 shows the tool 100 being used to pull a product 214 hanging on a peg hook 210 to the front end 212 of the peg hook 210. In particular, to provide for greater visibility of the product 214, the section 162 of the elongated portion 104 of the tool 100 can be used to hook around the product 214 and pull the product 214 to the front end 212 of the peg hook 210.

Figure 10:
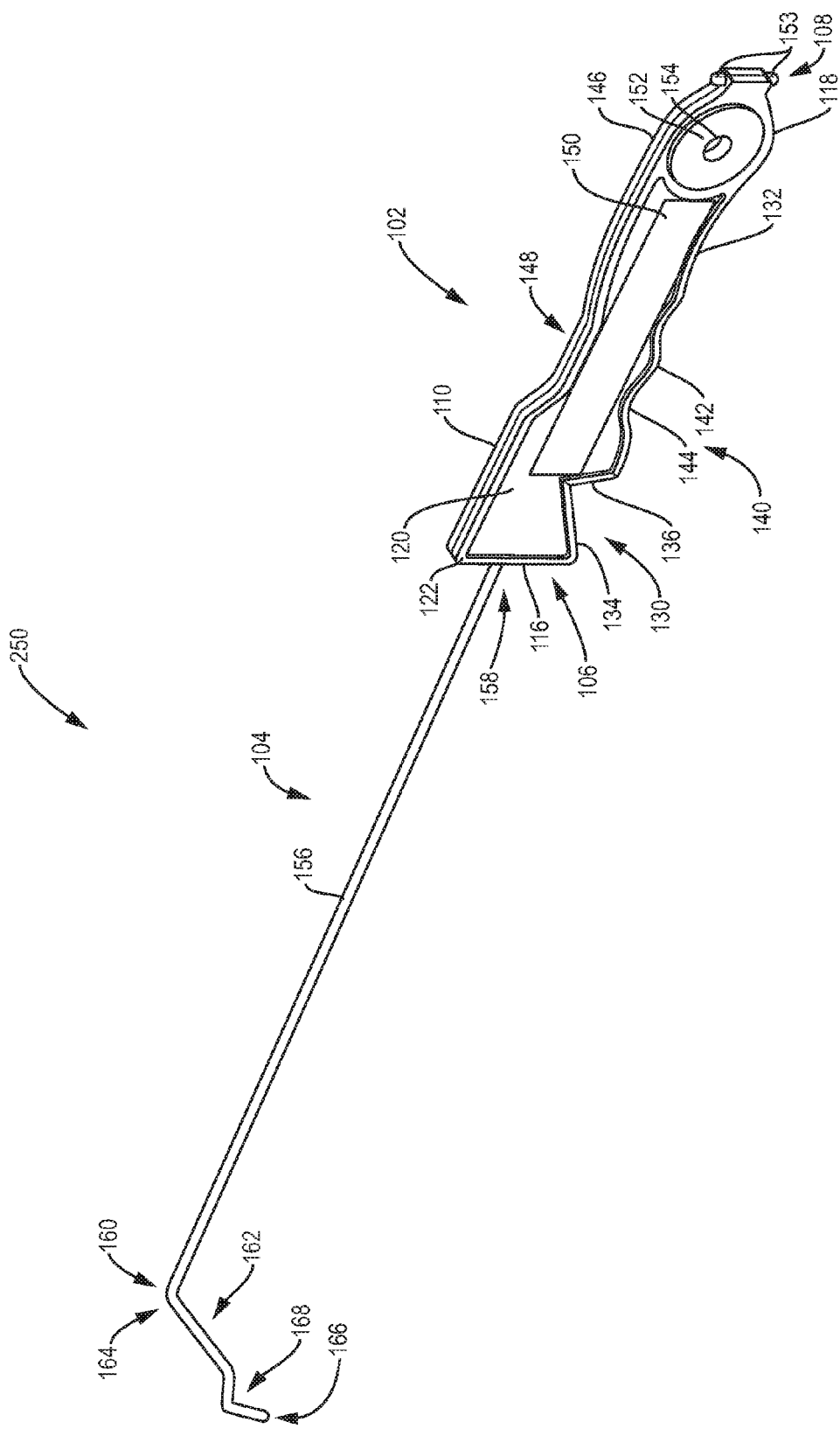
FIG. 10 is a perspective view of an exemplary overstock audit tool of the present disclosure.
Figure 11:
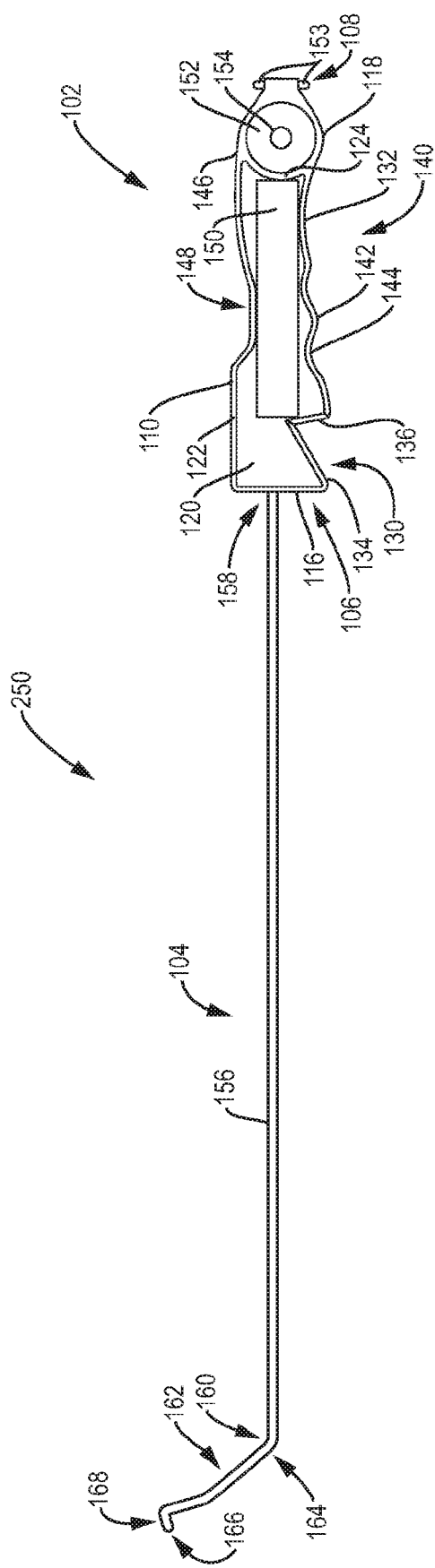
FIG. 11 is a side view of an exemplary overstock audit tool of FIG. 10.

FIGS. 10, 11 and 17 are perspective and side views of an exemplary embodiment of a tool 250. The tool 250 is substantially similar in structure and function to the tool 100, as described herein with reference to FIGS. 1-9, except for the distinctions noted herein. Therefore, like reference numbers are used to represent like structures. As shown in FIGS. 10 and 11, the label section 150 can include information, such as the name of the product, the overstock standards (e.g., maximum height corresponding to the length of the elongated portion 104, maximum width, and maximum weight of overstock), a logo, and the like. As shown in FIG. 17, in some embodiments, the elongated section 156 can be telescoping such that the overall length 172 of the elongated section 156 can be varied based on the overstock standards and/or for storage. The tool 250 can include one or more cutting edges or points 153 extending (or extendable) from the distal end 108. The cutting edge or point 153 can be used to open boxes or cut other materials, such as tape.

Figure 12:
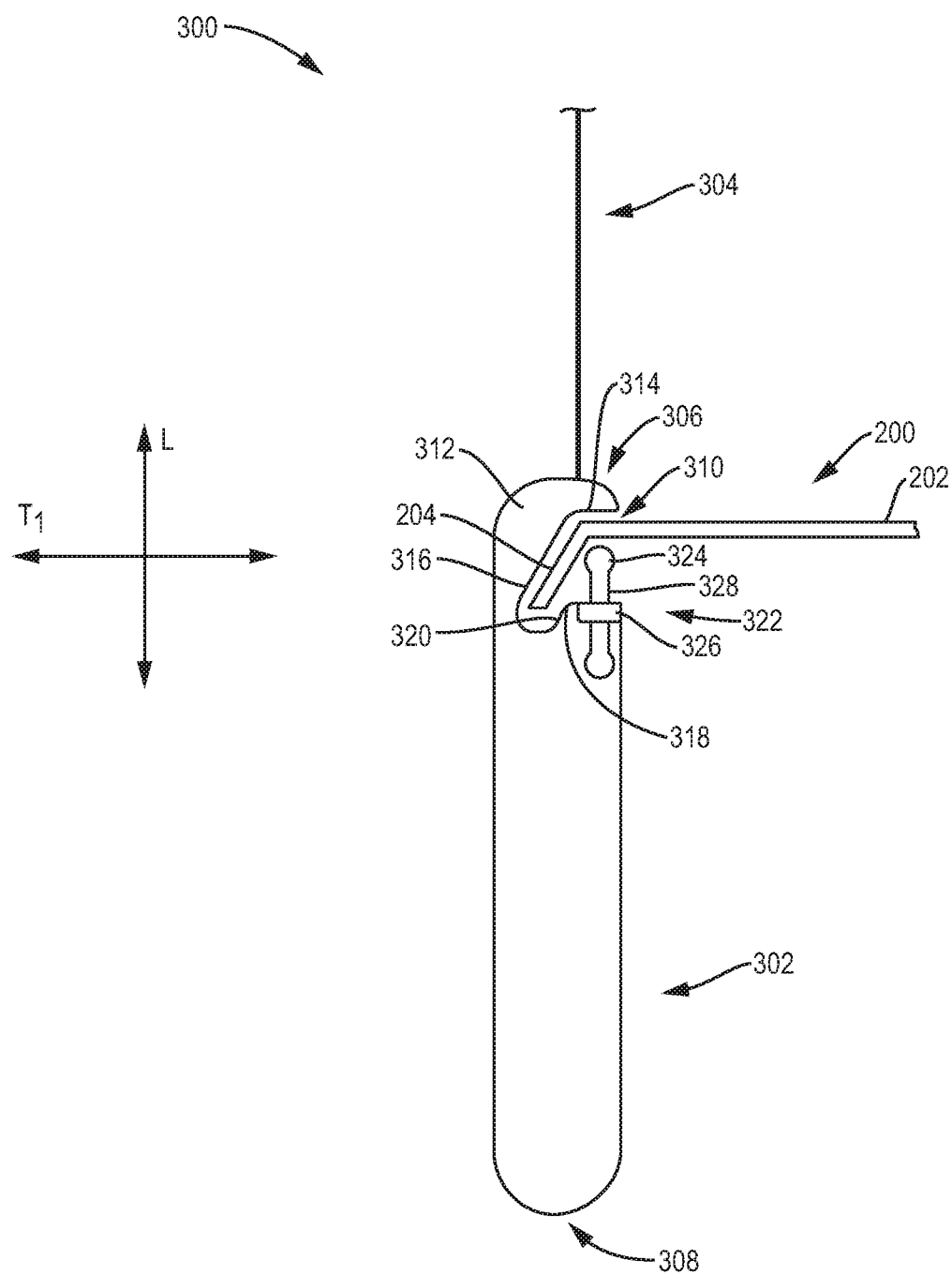
FIG. 12 is a side view of an exemplary overstock audit tool of the present disclosure.

FIG. 12 shows a side view of an alternative embodiment of an overstock audit tool 300 (hereinafter "tool 300") engaged with a portion of the shelf 200. The tool 300 can be substantially similar in structure and function to the tools 100 and 250, as described herein with reference to FIGS. 1-11, except for the distinctions noted herein. The tool 300 includes a handle portion 302 and an elongated portion 304 extending from the handle portion 302. The handle portion 302 is formed by a body 312 extending along a longitudinal axis L between the proximal end 306 and a distal end 308. The elongated portion 304 can extend from the proximal end 306 of the handle portion 302 along the longitudinal axis L. The handle portion further includes a width measured along a first transverse axis $T_1$, and a depth measured along a second transverse axis $T_2$ (see, e.g., FIG. 13). The handle portion 302 includes a cutout 310 formed in the body 312 near the proximal end 306. In some embodiments, the cutout 310 can be spaced from the proximal end 306.

The cutout 310 can include a first planar section 314 extending inwardly substantially parallel to the proximal end 306 and a first angled section 316 extending inwardly from the first planar section 314. The cutout 310 can include a second planar section 318 connecting to the first angled section 316 at an edge 320. The cutout 310 can be configured and dimensioned to receive therein a portion of the shelf 200. In particular, the first planar section 314 can be configured to mate against the top surface 202 of the shelf 200, and the first angled section 316 can be configured to mate against the front, angled surface 204 of the shelf 200.

In some embodiments, the handle portion 302 can include a roller mechanism 322 associated with the cutout 310. In some embodiments, the roller mechanism 322 can be secured to the second planar section 318 such that when a portion of the shelf 200 is received in the cutout 310, the roller mechanism 322 is disposed below the top surface 202 of the shelf 200. The roller mechanism 322 can include one or more bearings 324 and a tensioner 326. The bearings 324 can be secured to opposing sides of an elongated rod 328 passing through the tensioner 326. The tensioner 326 can maintain the bearings 324 against the bottom surface of the shelf 200 to interlock the tool 300 with the shelf 200. Therefore, the tool 300 does not need to be supported by the user at all times. The roller mechanism 322 further allows the tool 300 to be slid across the shelf 200 while measuring compliance of different overstock without removing the handle portion 302 from the shelf 200.

In some embodiments, when reaching a section connecting two shelves, the tensioner 326 can be used to disengage the shelf 200, flip or pivot the handle portion 302 away from the shelf 200 to pass over the connecting section of the shelves and, once passed, the tensioner 326 can be used to engage the handle portion 302 with the shelf 200. Thus, as disclosed herein, the exemplary overstock audit tools advantageously allow for repeated, accurate measurements of overstock storage compliance to be taken in retail environments in an efficient manner.

Figure 13:
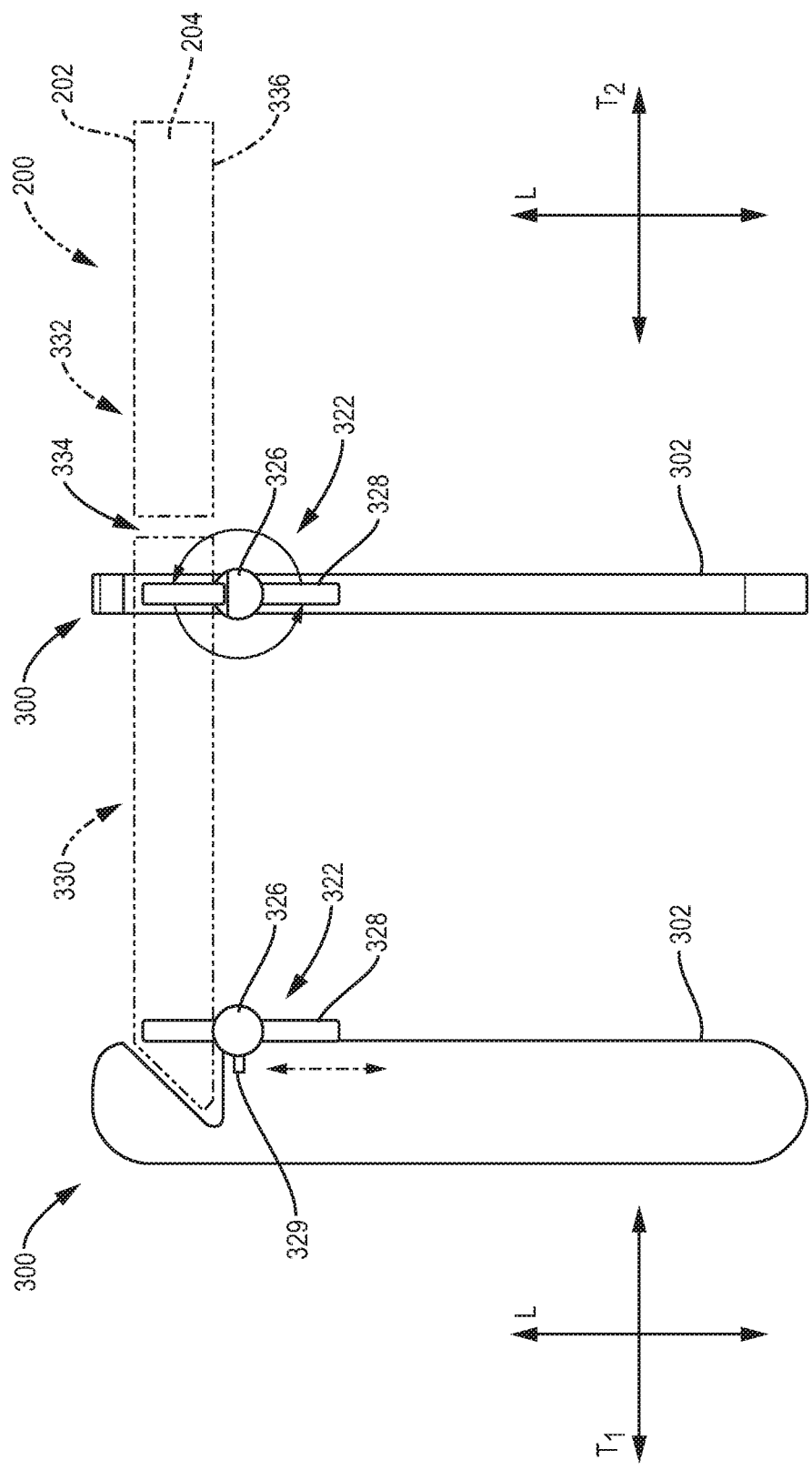
FIG. 13 are side and front diagrammatic views of an exemplary overstock audit tool of FIG. 12 engaged with a first shelf.
Figure 14:
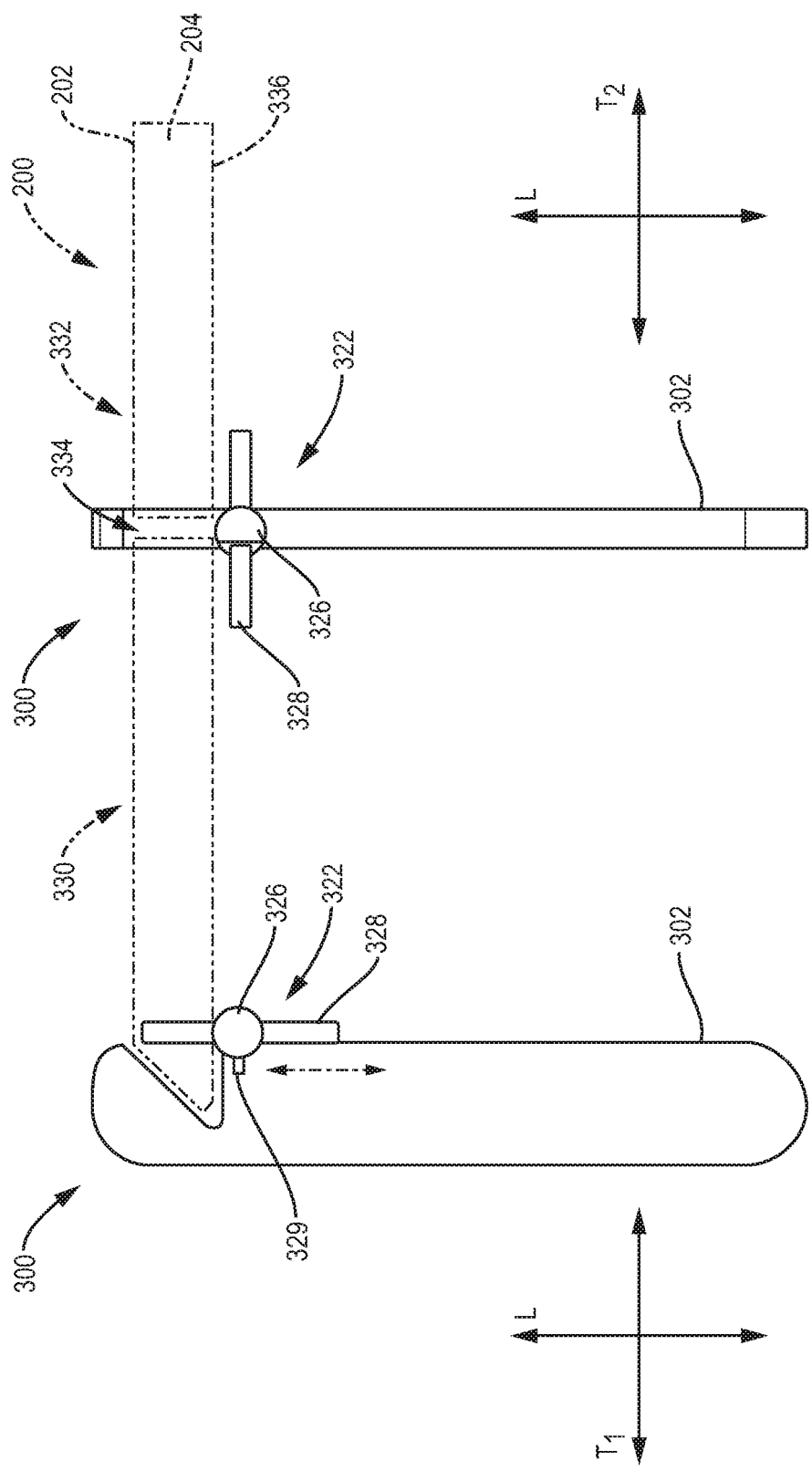
FIG. 14 are side and front diagrammatic views of an exemplary overstock audit tool of FIG. 12 disengaged from the first shelf and passing through a shelf interchange.
Figure 15:
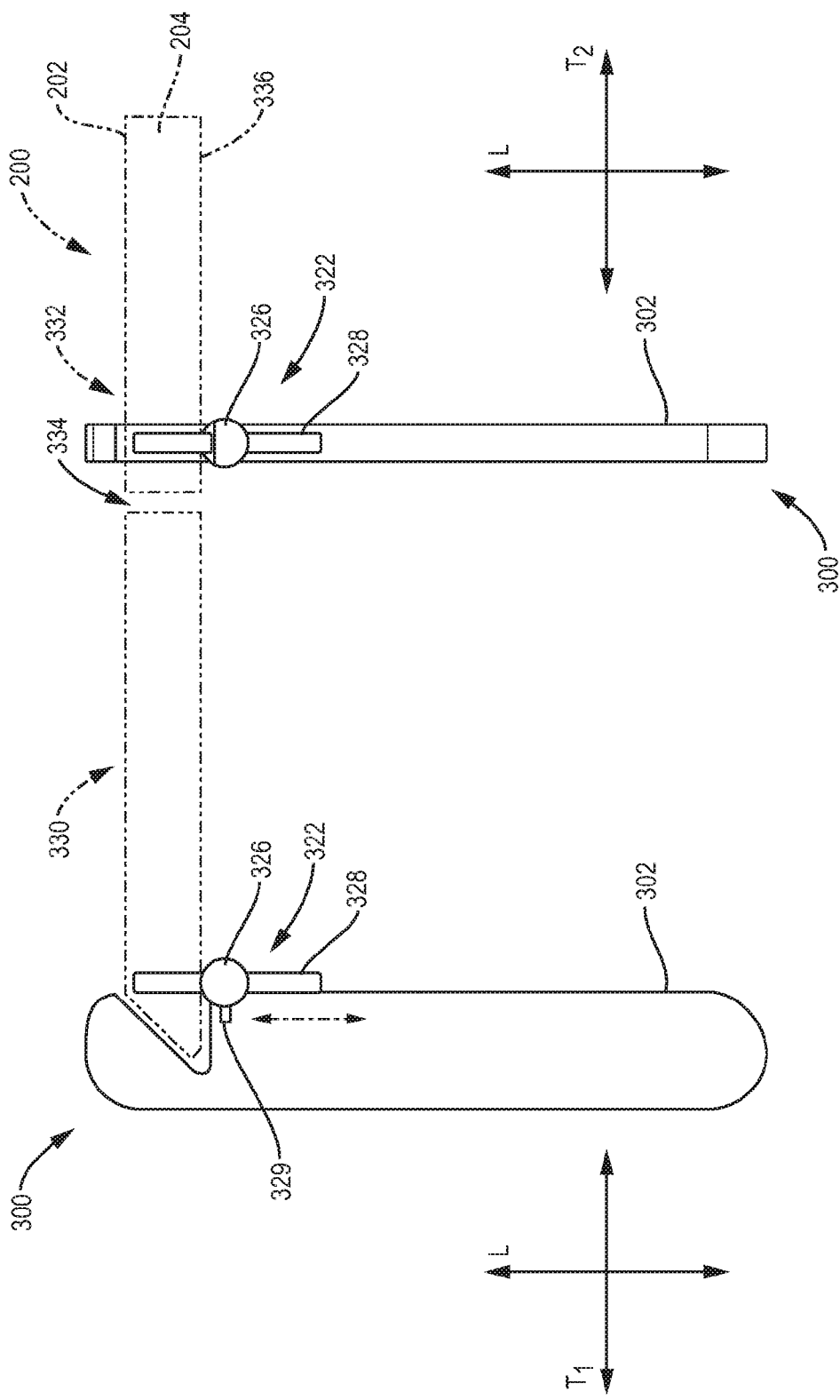
FIG. 15 are side and front diagrammatic views of an exemplary overstock audit tool of FIG. 12 engaged with a second shelf.

FIGS. 13-16 are side and front diagrammatic views of the tool 300 engaged with shelving and disengaged from shelving to pass through a shelf interchange. In particular, FIGS. 13-15 show a first shelf 330 positioned adjacent to a second shelf 332 with a shelf interchange 334 therebetween. The shelf interchange 334 generally includes flanges and structures of the shelf 200 that prevent the tool 300 from sliding directly from the first shelf 330 to the second shelf 332 while the roller mechanism 322 is engaged with the shelf 200. In general, the roller mechanism 322 can bias the elongated rod 328 (and/or the bearings 324) against and in the direction of the top surface 202 of the shelf 200. The spring-loaded biasing force maintains the tool 300 engaged with the shelf 200.

The tensioner 326 can include a detent pin or release latch 329 that can be depressed to release the spring-loaded biasing force against the shelf 200. In addition, depressing the release latch 329 allows the elongated rod 328 to rotate 90° at the tensioner 326. When the tool 300 is positioned against the shelf 200, the tensioner 326 can be disposed below the bottom surface 336 of the shelf 200. Thus, when the elongated rod 328 is rotated 90°, the elongated rod 329 can be moved out of the way for the roller mechanism 322 to pass through the shelf interchange 334.

For example, FIG. 13 shows the tool 300 and the roller mechanism 322 engaged with the first shelf 330 and disposed adjacent to the shelf interchange 334. As noted above, the tool 300 can slide along the edge of the first shelf 330 up to the point of the shelf interchange 334. In FIG. 13, the roller mechanism 322 maintains tension on the elongated rod 328, thereby maintaining engagement of the tool 300 with the first shelf 300. FIG. 14 shows the elongated rod 328 of the roller mechanism 322 rotated 90° and disengaged from the first shelf 330. By disengaging the roller mechanism 322 from the first shelf 300, the tool 300 can slide between the first and second shelves 330, 322 and the shelf interchange 334 (and below the bottom surface 336 of the shelf 200) while maintaining aligned of the tool 300 with the top surface 202 of the shelf 200. FIG. 15 shows the roller mechanism 322 engaged with the second shelf 332. In particular, after passing the shelf interchange 334, the elongated rod 328 can be released or repositioned to impart a biasing force against the second shelf 332, thereby maintaining the tool 300 engaged with the second shelf 332. Thus, the tool 300 can slide between adjacently positioned shelves while maintaining the tool 300 aligned with the top surface 202 of the shelves.

Figure 16:
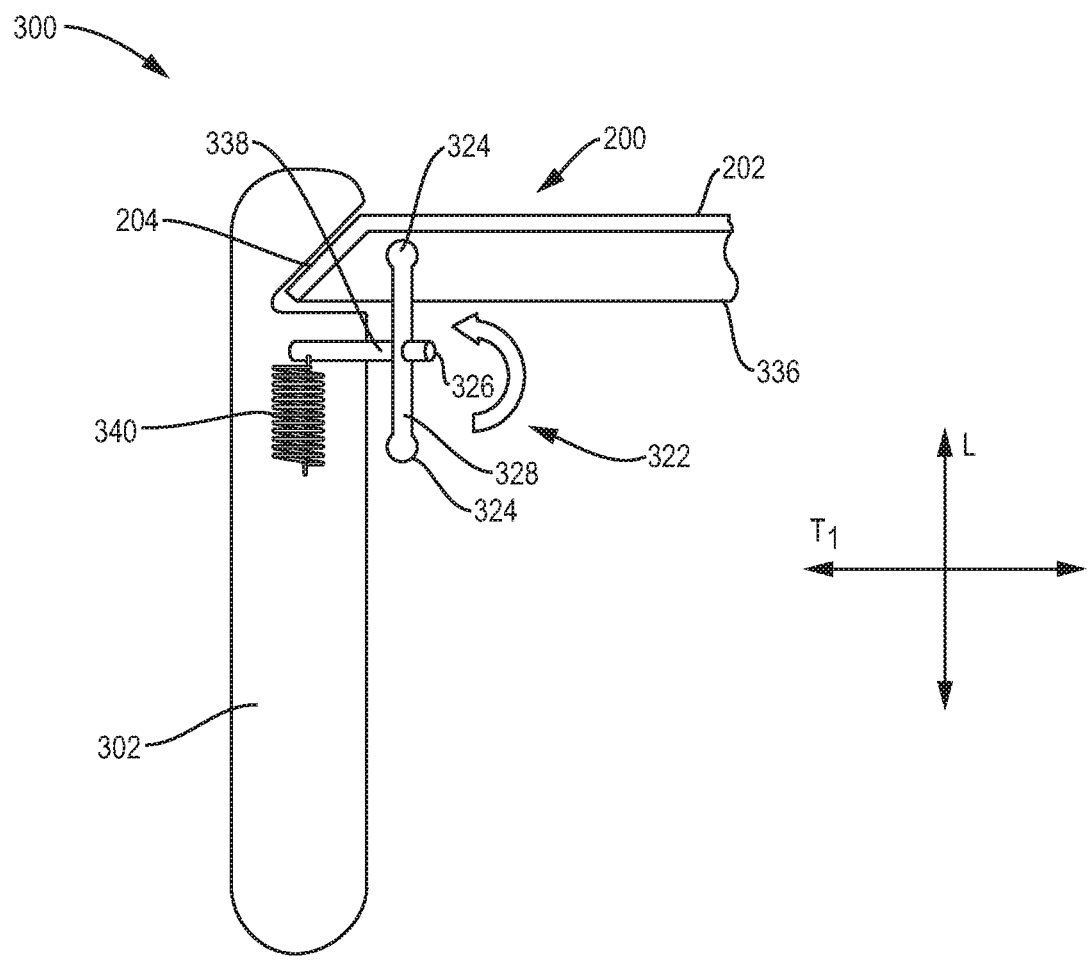
FIG. 16 is a side diagrammatic view of an exemplary overstock audit tool of FIG. 12.

With reference to FIG. 16, in some embodiments, rather than a release latch 329, the tensioner 326 can include a transverse rod 338 mechanically connected to and extending from the elongated rod 328. In particular, the transverse rod 338 extends from the elongated rod 328 in a perpendicular manner. The transverse rod 338 connects to a central position of the elongated rod 328 at one end, and connects to a spring 340 at an opposing end. The spring 340 can maintain a biasing force on the elongated rod 328 such that the elongated rod 328 remains in a substantially vertical position along the longitudinal axis L and against the underside of the top surface 202 of the shelf 200. When reaching a shelf interchange 334, the elongated rod 328 can be rotated or twisted by approximately 90°, thereby rotating the transverse rod 338 against the biasing force of the spring 340. After the tool 300 has been moved past the shelf interchange 334, the elongated rod 328 can be released and the biasing force of the spring 340 can return the elongated rod 328 into the position aligned with the longitudinal axis L.

While exemplary embodiments have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

The invention claimed is:

1. An overstock audit tool, comprising:
 a handle portion including (i) a body defining a distal end, a proximal end, and front and rear edges extending between the distal and proximal ends, and (ii) a cutout formed in the body, a first angled section of the cutout extending inwardly from the proximal end towards the distal end, and a second angled section of the cutout extending inwardly from the front edge towards the first angled section, the cutout being configured and dimensioned to be placed against a shelf edge to align the handle portion with the shelf edge; and
 an elongated portion attached to and extending from the proximal end of the handle portion.

2. The overstock audit tool of claim 1, wherein the cutout defines a substantially V-shaped configuration.

3. The overstock audit tool of claim 1, wherein the handle portion comprises a grip section formed in the body and disposed between the distal end and the proximal end.

4. The overstock audit tool of claim 3, wherein the grip section defines an undulating configuration on the front edge for grasping the handle portion.

5. The overstock audit tool of claim 3, wherein the grip section is formed in the body immediately adjacent to the cutout.

6. The overstock audit tool of claim 1, wherein the handle portion comprises a rounded distal end.

7. The overstock audit tool of claim 6, wherein the rounded distal end comprises a magnet.

8. The overstock audit tool of claim 1, wherein the elongated portion comprises an elongated first section and a second section extending at an angle from a distal end of the elongated first section.

9. The overstock audit tool of claim 8, wherein the elongated first section is dimensioned to define a height measurement standard.

10. The overstock audit tool of claim 8, wherein the second section extends perpendicularly relative to the elongated first section.

11. The overstock audit tool of claim 8, wherein the second section includes a V-shaped crook formed at a distal end of the second section.

12. The overstock audit tool of claim 1, comprising an inwardly directed concave portion formed in the rear edge of the handle portion.

13. A method of measuring overstock standard compliance, comprising:
 positioning an overstock audit tool against a shelf edge, the overstock audit tool including (i) a handle portion including a body defining a distal end, a proximal end, and front and rear edges extending between the distal and proximal ends, (ii) a cutout formed in the body, a first angled section of the cutout extending inwardly from the proximal end towards the distal end, and a second angled section of the cutout extending inwardly from the front edge towards the first angled section, the cutout being configured and dimensioned to receive and engage the shelf edge, and (iii) an elongated portion attached to and extending from the proximal end of the handle portion;
 aligning the handle portion with the shelf edge by aligning the cutout with the shelf edge; and
 measuring a height of overstock relative to the shelf edge with the elongated portion.

14. The method of claim 13, wherein aligning the cutout with the shelf edge levels the overstock audit tool relative to the shelf edge.

15. The method of claim 13, wherein the cutout maintains alignment between the handle portion and the shelf edge while sliding the handle portion along the shelf edge.

* * * * *